April 5, 1927.
R. C. HOLMES
TREATING HYDROCARBON OILS
Filed Aug. 17, 1921
1,623,729
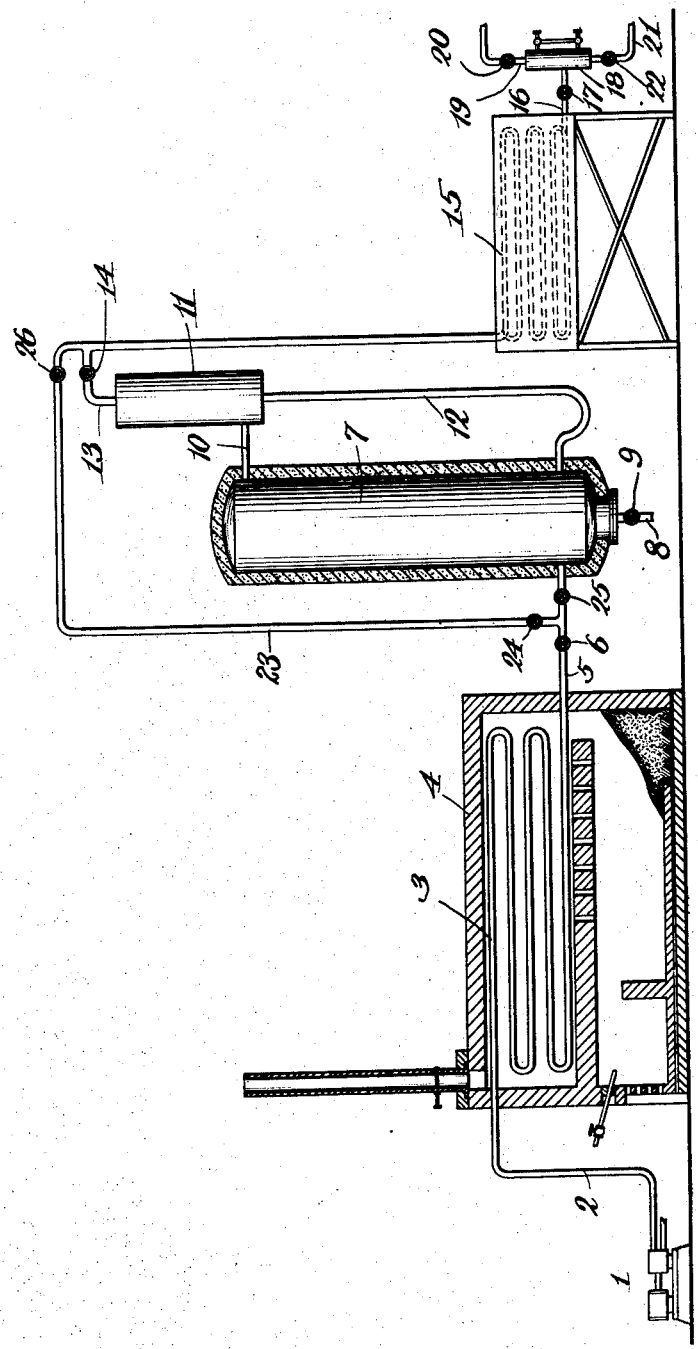

Patented Apr. 5, 1927.

1,623,729

UNITED STATES PATENT OFFICE.

RALPH C. HOLMES, OF NEW YORK, N. Y., ASSIGNOR TO THE TEXAS COMPANY, OF NEW YORK, N. Y., A CORPORATION OF TEXAS.

TREATING HYDROCARBON OILS.

Application filed August 17, 1921. Serial No. 492,891.

This invention relates to a new and improved continuous process for treating hydrocarbon oils such as crude petroleum and the derivatives thereof, for the purpose of essentially altering the character of the oils treated. The invention contemplates: (a) the digestion of the oil by subjection to heat under extremely high pressures with the object of bringing about certain transformations or conversions in the character of the oil so as to improve the quality thereof; (b) the distillation of the digested oil at a predetermined superatmospheric pressure materially lower than that used in the first step in order to vaporize and separate out certain desired lighter constituents from the treated and improved oil and; (c) the condensation of the separated vapors preferably under superatmospheric pressure either equal to or lower than that maintained during distillation.

It frequently happens that crude petroleum as received from the wells and also some of the heavy residues derived from the distillation of crude oil, are of such a viscous nature that they are unsuited for use as liquid fuel or for many other uses. In accordance with the present invention these viscous oils are digested by heating under such pressures that a molecular transformation of the hydrocarbon compounds occurs so as to reduce the viscosity of the oil and render it more suitable for fuel and other purposes. The reactions occurring are not fully understood but it is sufficient to state that when the viscous oils are treated in accordance with my invention there is a polymerization or rearrangement of hydrocarbon molecules in some manner such that there is an essential reduction in the viscosity of the oil and an increase in the specific gravity thereof, thus raising the calorific power of the oil and thereby rendering it more suitable for use as a liquid fuel.

The process may also be so controlled as to not only transform and improve the quality and properties of the oil but also to cause a conversion of higher boiling hydrocarbon compounds into lower boiling ones so as to produce distillates suitable for motor fuels or for other analogous purposes.

When operating in accordance with this modified method, the oil after having been thus transformed or converted under extremely high pressure, which is substantially a digestion process, is delivered into an enclosed distilling chamber in which the pressure is considerably reduced and in consequence of which certain of the lighter constituents immediately vaporize or distill off and are subsequently condensed, preferably under pressure, while the remaining oil of improved and modified characteristics is withdrawn in liquid form and collected.

My invention is characterized in part by the use of extremely high pressures, preferably from 500 to 3000 pounds, by which the concentration or digestion of the oils being continuously treated is increased to an extent that has not hitherto, so far as I am aware, been attained and whereby certain important results are achieved.

In prior methods of treating hydrocarbon oils the oil has been cracked in the vapor phase and in a combined liquid-vapor phase, that is, the liquid oil has been vaporized and the vapors subjected to decomposing temperatures and the liquid has been subjected directly to sufficient heat for decomposition, the generated vapors being in contact with liquid oil during the treatment, but prior to the present invention no continuous process has been developed by which the oil is converted in a coil or conduit of restricted cross section under a sufficiently high pressure to maintain the oil in liquid phase and the oil then subjected to reduction in pressure, although still maintained under a material superatmospheric pressure, to distill off the low boiling point product desired. In accordance with my invention the liquid oil is subjected to such high pressures that molecular decomposition or digestion is effected while substantially the entire quantity of oil being treated remains in a liquid condition.

The increased pressures to which the oil is subjected in accordance with my invention increase the solubility of the liquid for the permanent gases generated. These fixed gases are thus held in solution in the liquid with the result that chemical equilibrium is established tending to a reduction in the formation of permanent gases.

By holding the materials to be treated in a liquid condition there is a more efficient diffusion of heat through the materials than is the case where a greater or less proportion of the material is in a vapor or gaseous state. Heat is readily transferred through the liquid with the result that the oil is held at a practically uniform temperature and any localized over-heating is reduced to a minimum.

By avoiding decomposition in the vapor phase the excessive formation of carbon and permanent gas which occurs in vapor phase methods of operation is obviated and the reduction in the viscosity of heavy viscous oils or the production of gasolene and similar light products is carried on with a minimum production of gas and free carbon.

The small amount of carbon that is produced in the operation of my process is adequately taken care of since the increase in liquid volume of the oil being treated affords a greater facility for holding the carbon in suspension and for continuously flushing it out from the decomposition vessel, thus preventing excessive deposition of carbon on the heated walls of the still or coil in which the oil is being decomposed.

In accordance with the invention the oil to be treated either for the reduction of the viscosity thereof or for the production of light products, such as gasolene, is continuously forced through a coil under pressures preferably from 500 to 3000 pounds and while under this high pressure is heated at a temperature sufficient for the desired molecular transformation while the oil is in transit through the coil. Since molecular decomposition is dependent not only on temperature and pressure, but also on a time element or period during which these temperatures and pressures must be maintained, the rate of flow of the oil is so chosen that these cracking conditions will be sustained for a period long enough for the conversion or digestion to take place entirely within the coil. The temperatures used are preferably from 700° to 900° F. At temperatures under 700° F. the rate of reaction is so reduced that such lower temperatures are not to be recommended. On the other hand temperatures above 900° F. may, if desired, be used, but since adequate results can be obtained by the use of the preferred temperatures stated the higher temperatures are unnecessary. It may be pointed out that the high temperatures which are frequently used in the vapor phase systems of cracking are wholly unnecessary with the high pressures employed in my process.

In the event that the lighter products are to be separated out, the oil after having been subjected to the temperatures and pressures stated for the necessary time period and thus digested and transformed, is transferred to a distilling vessel which is maintained under superatmospheric pressure wherein the lighter products are vaporized and separated from the liquid. In case the separation and distillation is not desired, however, the oil may be transferred directly from the high pressure digesting zone to a cooling coil after which the improved oil is collected. If the mode of procedure involving the separation of lighter products is carried out it is preferred to carry on the distillation under a considerably reduced although very material superatmospheric pressure, in order that the light products held in the liquid stage in the decomposition chamber may be readily released in the form of vapor in the distilling vessel, and at the same time it is desirable to maintain a like pressure or a somewhat lower pressure in the condenser so that a maximum quantity of the more volatile bodies may be retained in the vapors after they are condensed. The reduction in pressure in the distilling vessel must not be much in excess of 25%, otherwise the distillation will be too rapid and complete.

The invention is, therefore, further characterized by the selective distillation or vaporization of only those lighter fractions which in the particular instance are desired, and which separation is effected by maintaining sufficient pressure in the distilling chamber to hold all but the desired constituents in liquid form. The pressure of the distilling chamber is very substantial and depends in a large measure upon the nature and character of the constituents which are to be removed by distillation. Although a considerable range of pressures may be used, a reduction in pressure of somewhere in the neighborhood of 25% will be found satisfactory under certain conditions. In this way, only those desired lighter fractions, which may be considered as a group, are permitted to distill off and be thus separated from remaining or residual oil, the characteristics of which have been modified and improved by the digestion process. Of course the component elements of this group will vary from the lightest fraction to several of the somewhat heavier fractions according to the results to be obtained; it may include even as high boiling fractions as naphtha or conceivably kerosene if desired, while on the other hand any fraction having a higher boiling point than gasoline may be excluded from the group. Having determined upon the element or elements of the group to be vaporized, the reduction in pressure is so chosen as to segregate by distillation the desired lighter constituents, while maintaining all of the constituents of higher boiling points in liquid form. This remaining liquid may be separately drawn off either continuously or from time to time and collected, this oil having undergone material transformation and having improved and modified characteristics.

The vapors generated in the distilling chamber and separated from the liquid oil are conducted to a separator and thence to a condenser where they are liquefied preferably under pressure and then passed to a receiver or collecting vessel. The pressure in the separator preferably corresponds to that of the still although that of the condenser may be dropped to substantially atmospheric. The condensation is preferably effected, however, under a superatmospheric pressure as explained above.

The single figure of the accompanying drawing is a diagrammatic elevation of an apparatus suitable for practising the process of my invention but it will be understood that any suitable apparatus may be employed.

In the apparatus shown a high pressure pump 1 is arranged to draw oil from a suitable source of supply and charge the oil through a pipe 2 into a cracking coil 3 which is suitably positioned in a furnace 4. The coil is equipped with an outlet 5 having a pressure regulating valve 6 and terminating in a distilling vessel or still 7.

The still 7 is preferably insulated, as illustrated, to prevent loss of heat by radiation. In some cases it may be desirable to set the still in a furnace and apply moderate heat to the still, since if the drop in pressure from the coil 3 to still 7 is great there will be considerable loss of heat due to expansion, and the application of additional heat may be needed to maintain the desired distilling temperature. I prefer, however, to only drop the pressure about 25% and no external heat will usually be required. Even if found desirable to apply a moderate degree of external heat, the amount will be so small that the still 7 may serve without danger or detrimental effect as a collector for whatever slight amount of carbon that may be formed in the digesting coil and carried into the still. The temperature used in the still 7 depends largely upon the flash point or boiling point of the improved liquid products it is desired to withdraw therefrom, or the amount and character of the distillate it is desired to take off.

The still 7 is equipped with an outlet line 8 controlled by a valve 9 by which the liquid products are withdrawn to a suitable storage. It is also provided with a vapor outlet 10 which preferably conducts the vapors from the still to a separator or air condenser 11 in free communication with the still. The separator has a back-trap line 12 to return the condensate to the bottom of the still, and is also provided with a vapor line 13 having a pressure regulating valve 14 and communicating with a condensing coil 15. This coil may be operated at the same pressure as the still and separator but preferably at somewhat reduced pressure or, in fact, even at atmospheric pressure. The condenser 15 has an outlet 16 which may have a pressure-regulating valve 17 for determining the pressure of the condenser.

The outlet 16 terminates in a receiver drum 18 having a gas line 19 with a control valve 20 and a liquid outlet 21 with a control valve 22. It is understood that if desired the air condenser may be omitted between the still 7 and condenser 15, and that other conventional equipment known to the art may be used in connection with the apparatus shown. A by-pass line 23 having valves 24 and 26 extends from the outlet pipe 5 to the condenser coil 15.

In employing the specific apparatus illustrated the oil to be treated is forced by the pump 1 into the cracking coil 3 wherein the oil is subjected for a suitable period of time to the required heat for digestion or transformation, preferably 700° to 900° F. while under the high pressures, preferably 500 to 3000 pounds, as has hereinbefore been set forth. The oil is thus digested in the coil and transformed in character and the resulting products passed to the distillatory chamber 7 wherein a selective separation of the desired group of lighter fractions from the liquid products occurs. As already explained, this separation by distillation of the desired lighter constituents, depends upon the pressure maintained in the distilling vessel, which under certain conditions is preferably about 25% lower than in the digesting or decomposition coil.

The viscous crude petroleum or viscous residues thereof which are withdrawn from the still are essentially changed in character by this treatment being characterized by decreased viscosities and increased specific gravities, these liquid products being collected in the vessel 7 and drawn off through the outlet 8. The vaporized constituents formed in the process are removed by the vapor line 10 to the air condenser 11 wherein the heavier portions are condensed and back-trapped to the still through pipe 12. The uncondensed portions pass through the condenser 15 and are liquefied and subsequently collected in the receiving vessel 18.

The pressure in the system is controlled by the various valves shown; the valve 6 is utilized to control the reduction in pressure from the digesting or cracking zone to the distilling zone, and the valves 14, 17, 20 and 22 are employed to regulate the pressure in the distilling chamber, separator and condenser. The valve 14 may be used to control the pressure in the still 7 and separator 11, but, if desired, the still 7, separator 11 and condenser 15 may be in open communication with each other and the pressure regulated by the valve 17 or by controllably releasing the permanent gases by means of the valve 20 and also by regulating the flow of distillate through the valve 22.

When it is desired merely to reduce the viscosity of the original oil without carrying on any distillation thereof, the use of the distilling chamber 7 may be omitted and the oil passed from the high pressure coil 3 through the line 23 to the cooling coil 15. For this purpose, the additional valves 24, 25 and 26 are provided. The treated and modified oil is collected in the receiver 18.

It is to be observed that the process of my invention is a continuous one since the oil may be constantly charged into the system by means of pump 1, the treated liquid withdrawn through the outlet 8 and the distillate which collects in the receiving drum 18, removed either intermittently or continuously as occasion requires.

While the process is adapted for treating any type of hydrocarbon oil the viscosity of which it is desired to reduce or in the production of lower boiling compounds from the higher boiling components of any oil, certain grades of oil may be specifically mentioned as being well adapted to be treated by the herein described process. Many of the asphaltic crudes, such as those of California and Mexico, are so viscous that they are unsuited for fuel without admixture with other petroleum. These crude petroleums or heavy residues derived therefrom may be treated in accordance with my invention with the result that the viscosity is lowered so that they are in a more suitable form for liquid fuel while at the same time the calorific power of the oil is increased. In addition to thus improving the character of the residual oil formed in the process, the quantity of light products which may be obtained therefrom is increased by the process so that besides improving the character of the residue many of these oils which contain little or no natural gasolene may be treated to yield a large production of gasolene or analogous products.

Obviously, various modifications of the invention may be effected without departing from the spirit and scope of the invention. The true scope of the invention is defined in the appended claims.

What I claim is:

1. The process of producing low boiling hydrocarbon oils by the conversion of higher boiling hydrocarbon oils, which comprises passing the high boiling oil to be treated once only through a confined passage of substantially uniform cross-section without substantial enlargements, said passage being heated to impart to the oil a temperature of about 700 to 900° F., completing the entire desired conversion in said passage, maintaining upon the oil in the passage a pressure of upwards of 500 pounds, the pressure employed being such that the entire oil is maintained in continuous liquid phase during the entire conversion, whereby the entire conversion is effected without substantial production of coke, discharging the completely converted oil into an enlarged chamber to which no additional heat is imparted, said chamber being at substantially reduced pressure whereby vaporization of the desired low boiling products together with higher boiling products is effected, removing such vapors, separating therefrom by condensation the products of higher boiling point than the desired low boiling point products, returning separated higher boiling point products to the unvaporized liquid in the chamber, thereby modifying its characteristics and withdrawing completely from the system unvaporized liquid with admixed condensed products from the vapors.

2. The process of converting high boiling hydrocarbon oil into lower boiling products which comprises continuously forcing oil once only through an elongated cracking coil of substantially uniform cross-section, and delivering it directly and immediately into a body of oil in the lower part of a separate unheated enlarged chamber, heating the cracking coil to effect the desired degree of conversion of the oil in transit at a cracking temperature of about 700° F. to 900° F. and under a pressure of upwards of 500 lbs. per square inch, the pressure being sufficient to hold all of the oil in the coil in the liquid phase whereby the entire conversion is effected without the production and deposition of substantial amounts of carbon in the coil, substantially reducing the pressure on the converted oil before it enters the chamber to prevent further cracking thereof and effect the vaporization of the major portion of the oil therein, removing the vapors formed, subjecting the vapors to partial condensation to separate out the heavier constituents, condensing and collecting the lighter constituents, cyclically returning heavier condensate to the body of residual oil in the chamber without passing it through the coil to cool the body of oil and improve and modify its characteristics, and substantially continuously discharging from the chamber the admixed residual oil and heavy condensate.

In witness whereof I have hereunto set my hand this 15 day of August, 1921.

R. C. HOLMES.